United States Patent
Xian et al.

(10) Patent No.: US 9,141,839 B2
(45) Date of Patent: Sep. 22, 2015

(54) SYSTEM AND METHOD FOR READING CODE SYMBOLS AT LONG RANGE USING SOURCE POWER CONTROL

(71) Applicant: Hand Held Products, Inc., Fort Mill, SC (US)

(72) Inventors: Tao Xian, Bordentown, NJ (US); Gennady Germaine, Cherry Hill, NJ (US); Ynjiun Paul Wang, Cupertino, CA (US); Stephen Colavito, Garnet Valley, PA (US); Erik Van Horn, Ocean View, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/912,702

(22) Filed: Jun. 7, 2013

(65) Prior Publication Data

US 2014/0361082 A1    Dec. 11, 2014

(51) Int. Cl.
*G06K 7/10* (2006.01)

(52) U.S. Cl.
CPC ................................. *G06K 7/10821* (2013.01)

(58) Field of Classification Search
USPC .................................... 235/454, 455, 462.06
See application file for complete search history.

(56) References Cited

U.S. PATENT DOCUMENTS

| | | | |
|---|---|---|---|
| 5,677,523 A * | 10/1997 | Coleman | 235/455 |
| 5,834,760 A | 11/1998 | Ackley et al. | |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van Horn et al. | |
| 8,408,469 B2 | 4/2013 | Good | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/367,978, filed Feb. 7, 2012, (Feng et al.); now abandoned.

(Continued)

*Primary Examiner* — Kristy A Haupt
(74) *Attorney, Agent, or Firm* — Additon, Higgins & Pendleton, P.A.

(57) ABSTRACT

A system and method are presented for improving the performance of code scanners in the extended and far ranges. At these distances, the intensity of the laser beam reflected off the code symbol can be markedly decreased, thereby decreasing the likelihood of a successful reading of the code symbol by the code scanner. The system provides for dynamic power increases to the laser source to generate a greater dynamic range.

19 Claims, 4 Drawing Sheets

(56) References Cited

U.S. PATENT DOCUMENTS

| | | |
|---|---|---|
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |

(56) References Cited

U.S. PATENT DOCUMENTS

| | | |
|---|---|---|
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control, filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination, filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion, filed Mar. 4, 2014 (Lui et al.); 25 pages.

U.S. Appl. No. 14/342,544 for Imaging Based Barcode Scanner Engine with Multiple Elements Supported on a Common Printed Circuit Board, filed Mar. 4, 2014 (Liu et al.); 27 pages.

U.S. Appl. No. 14/257,174 for Reading Apparatus Having Partial Frame Operating Mode, filed Apr. 21, 2014, (Barber et al.), 67 pages.

U.S. Appl. No. 14/200,405 for Indicia Reader for Size-Limited Applications, filed Mar. 7, 2014 (Feng et al.); 42 pages.

U.S. Appl. No. 14/166,103 for Indicia Reading Terminal Including Optical Filter, filed Jan. 28, 2014 (Lu et al.); 29 pages.

U.S. Appl. No. 14/274,858 for Mobile Printer With Optional Battery Accessory, filed May 12, 2014, (Marty et al.), 26 pages.

U.S. Appl. No. 14/264,173 for Autofocus Lens System for Indicia Readers, filed Apr. 29, 2014, (Ackley et al.), 39 pages.

U.S. Appl. No. 14/230,322 for Focus Module and Components with Actuator, filed Mar. 31, 2014 (Feng et al.); 92 pages.

U.S. Appl. No. 14/222,994 for Method and Apparatus for Reading Optical Indicia Using a Plurality of Data, filed Mar. 24, 2014 (Smith et al.); 30 pages.

(56) References Cited

OTHER PUBLICATIONS

U.S. Appl. No. 14/231,898 for Hand-Mounted Indicia-Reading Device with Finger Motion Triggering, filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

\* cited by examiner

SYSTEM AND METHOD FOR READING CODE SYMBOLS AT LONG RANGE USING SOURCE POWER CONTROL

FIELD OF THE INVENTION

The disclosure relates generally to improvements in reading code symbols, and more particularly, to a system and method for reading code symbols at long range using source power control.

BACKGROUND OF THE DISCLOSURE

A code symbol reading device (e.g., barcode scanner, barcode reader, RFID reader) is a specialized input device for certain data systems commonly used by retailers, industrial businesses, and other businesses having a need to manage large amounts of inventory. Code symbol reading devices are often employed to read barcodes. A barcode is a machine-readable representation of information in a graphic format. The most familiar of these graphic symbols is a series of parallel bars and spaces of varying widths, which format gave rise to the term "barcode." The adoption of the Universal Product Code (UPC) version of barcode technology 1973 quickly led to a revolution in logistics by obviating the need for manual retry of long number strings.

Most barcode scanners operate by projecting light from an LED or a laser onto the printed barcode, and then detecting the level of reflected light as the light beam sweeps across the barcode. Using this technique, the barcode scanner is able to distinguish between dark areas and light areas on the barcode. More light is reflected from the light areas on the barcode than the dark areas, so the optical energy reflected back to the barcode scanner will be a signal containing a series of peaks corresponding to the light areas and valleys corresponding to the dark areas. A processor converts the received optical signal into an electrical signal. The processor decodes the peaks and valleys of the signal to decode the information (e.g., product number) represented by the code symbol.

Typically, barcode scanners have been designed to read barcodes in the near range (e.g., barcodes located less than about three feet from the barcode scanner). Recently, advancements have been made in developing barcode scanners capable of reading barcodes in the far range (e.g., barcodes located about 30 feet or more from the barcode scanner). Attempting to gather readings from a barcode located at these greater distances from the barcode scanner presents significant challenges. In particular, the further away that the barcode is from the barcode scanner, the weaker the return laser light signal will be at the time of signal detection at the photodetector. For barcode scanners having a substantially large scanning range (e.g., working range), in particular, this potentially dramatic variation in signal intensity strength at the photodetector places great demands on the electronic signal processing circuitry, and its ability to deliver sufficient signal-to-noise ratio (SNR) performance over broad dynamic ranges of input signal operation.

Consequently, great efforts have been made over the past few decades to provide laser scanning type barcode scanners, in particular, with automatic gain control (AGC) capabilities that aim to control the gain of the various analog scan data signal processing stages, regardless of input laser return signal strength. In general, feedback control is implemented in the analog domain, and the gain of an amplified stage is adjusted according to a controller. The controller could be, but is not limited to, proportional control, PID control or fuzzy logic control, etc. Also, the amplifier refers to, but is not limited to preamplifier or gain stages along the signal path.

The ability of these techniques of applying gain control to the received signal to achieve greater dynamic range is limited, for example, by the existence of laser noise. Increasing the gain of the received signal also results in proportional increases to signal noise (e.g., laser noise), which can significantly interfere with the ability to decode the scanned barcode.

Therefore, a need exists for a system for reading code symbols in a scanning field that increases the strength of the signal received by the photodetector without resulting in an increase in the strength of signal noise, thereby reducing the overall signal-to-noise ratio of the signal.

SUMMARY OF THE INVENTION

In one aspect, the present disclosure embraces a system for reading code symbols in a laser scanning field. The system includes a laser scanning module for scanning a laser beam across a laser scanning field. The laser scanning module includes a laser source. A photodetector detects the intensity of the light reflected from the laser scanning field and generates a first signal corresponding to the detected light intensity. A source power control module controls the supply of power to the laser source in response to the first signal. Typically, the source power control module controls the power to maintain the intensity of the light reflected from the laser scanning field within a predetermined intensity range.

In an exemplary embodiment, the source power control module is an automatic gain control circuit. In another exemplary embodiment, the source power control module is a microprocessor. In another exemplary embodiment of the system, the source power control module controls the gain of the first signal. Typically, the source power control module controls the gain of the first signal to maintain the first signal's amplitude within a predetermined amplitude range.

In another aspect, the disclosure embraces a method for reading code symbols at long range. Power is supplied to a laser source to generate a laser beam. The laser beam is scanned across a laser scanning field. The intensity of the light reflected from the laser scanning field is detected. A first signal is generated that corresponds to the detected intensity of light reflected from the scanning field. The power supply is controlled in response to the first signal.

DETAILED DESCRIPTION

Figure 1:
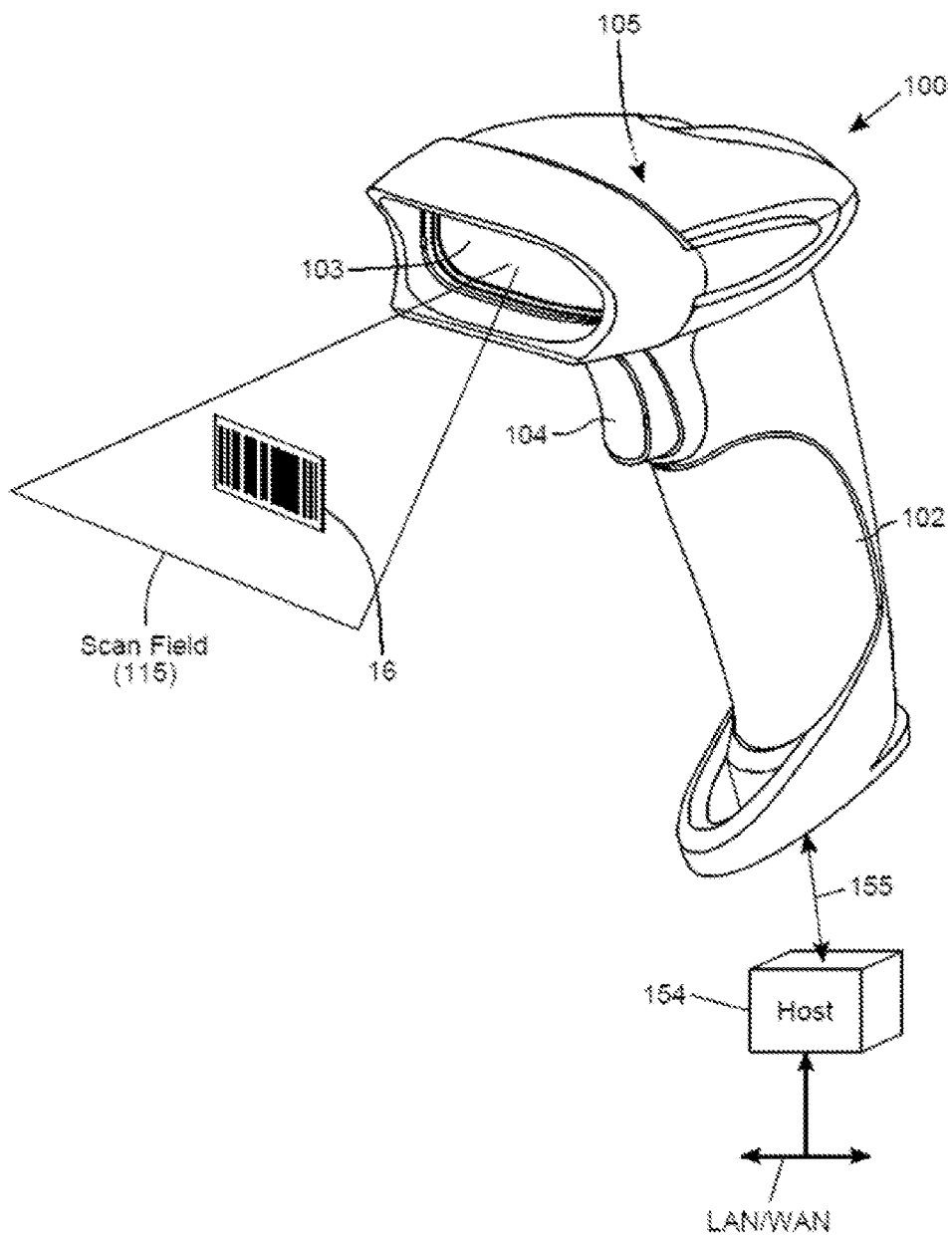
FIG. 1 is a perspective view of an exemplary embodiment of a code symbol reading system according to the present invention.
Figure 2:
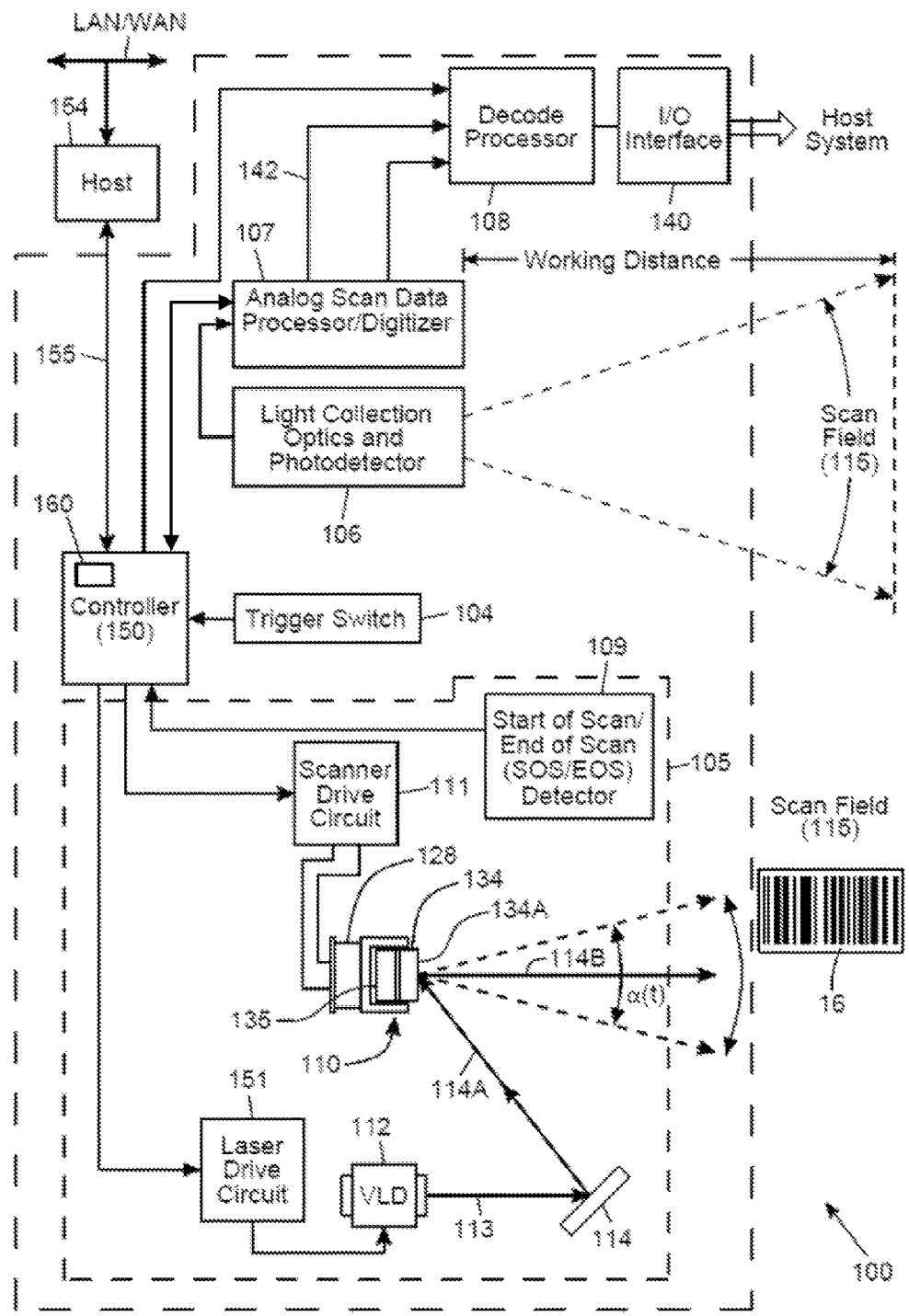
FIG. 2 is a schematic block diagram describing the major system components of an exemplary code symbol reading system according to the present invention.

Referring to the figures in the accompanying drawings, the illustrative embodiments of the code symbol reading system according to the present invention will be described in great detail, where like elements will be indicated using like reference numerals. Turning now to the drawings, FIGS. 1 and 2 depict an exemplary code symbol reading system according to the present invention. The code symbol reading system 100 has a housing 102 having a head portion and a handle portion supporting the head portion. A light transmission window 103 is integrated with the head portion of the housing 102. A trigger switch 104 is integrated with the handle portion of the housing 102. The trigger switch 104 is for generating a trigger event signal to activate a scanning module 105. The scanning module 105 repeatedly scans across its scanning field 115 a light beam (e.g., a visible laser beam) generated by light source 112 (e.g., a laser source). The laser source 112 has optics to produce a laser scanning beam focused in the scanning field 115 in response to control signals generated by a controller 150. The scanning module 105 also includes a laser driver 151 for receiving control signals from the controller 150, and in response thereto, generating and delivering laser (diode) drive current signals to the laser source 112. A start of scan/end of scan (SOS/EOS) detector 109 generates timing signals indicating the start of a laser beam sweep and the end of a laser beam sweep, and sends those timing signals to the controller 150 and a decode processor 108. Light collection optics collect light that has been reflected or scattered from a scanned object in the scanning field 115, and a photodetector 106 detects the intensity of the collected light. The photodetector 106 generates an analog scan data signal (e.g., a first signal) corresponding to the detected light intensity during scanning operations. An analog scan data signal processor/digitizer 107 processes the analog scan data signals and converts the processed analog scan data signals into digital scan data signals (e.g., a second signal). The digital scan data signals are converted into digital words representative of the relative width of the bars and spaces in the scanned code symbol. The digital words are transmitted to a decode processor 108 via lines 142. The decode processor 108 generates symbol character data representative of each code symbol scanned by the laser beam. An input/output (IO) communication interface module 140 interfaces with a host device 154. It is through this IO communication module 140 that the symbol character data is transmitted to the host device 154, which transmission may be done through wired (e.g., USB, RS-232) or wireless (e.g., Bluetooth) communication links 155 between the code symbol reading system 100 and the host device 154.

The controller 150 generates control signals to control operations within the code symbol reading system 100. The controller 150 includes a source power control module 160. The source power control module 160 is adapted to, under certain conditions, direct the laser driver 151 to adjust the power or intensity of the laser beam generated by the laser source 112.

The laser scanning module 105 includes several subcomponents. A laser scanning assembly 110 has an electromagnetic coil 128 and rotatable scanning element (e.g., mirror) 134 supporting a lightweight reflective element (e.g., mirror) 134A. A coil drive circuit 111 generates an electrical drive symbol to drive the electromagnetic coil 128 in the laser scanning assembly 110. The laser source 112 generates a visible laser beam 113. A beam deflecting mirror 114 deflects the laser beam 113 as an incident beam 114A towards the mirror component of the laser scanning assembly 110, which sweeps the deflected laser beam 114B across the laser scanning field 115 containing a code symbol 16 (e.g., barcode).

As shown in FIG. 2, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current $I_{DC}(t)$ supplied to the electromagnetic coil 128 during scanning operations. In general, the greater the level of drive current $I_{DC}(t)$ produced by scanner drive circuit 111, the greater the forces exerted on permanent magnet 135 and its associated scanning element. Thus, scan sweep angle $\alpha(t)$ of the scanning module 105 can be directly controlled by controlling the level of drive current $I_{DC}(t)$ supplied to the coil 128 by the scanner drive circuit 111 under the control of controller 150, shown in FIG. 2.

In response to the manual actuation of trigger switch 104, the laser scanning module 105 generates and projects a laser scanning beam through the light transmission window 103, and across the laser scanning field 115 external to the housing 102, for scanning an object in the scanning field 115. The laser scanning beam is generated by the laser source 112 in response to control signals generated by the controller 150. The scanning element (i.e., mechanism) 134 repeatedly scans the laser beam across the object in the laser scanning field at the constant scan sweep angle $\alpha(t)$ set by the controller 150 during scanning operation. Then, the light collection optics 106 collect light reflected/scattered from scanned code symbols on the object in the scanning field, and the photo-detector 106 automatically detects the intensity of collected light (i.e., photonic energy) and generates an analog scan data signal (e.g., a first signal) corresponding to the light intensity detected during scanning operations.

Typically, when the object bearing the code symbol 16 is in the near field of the code symbol reading system's 100 working distance (e.g., when the code symbol 16 is less than about seventeen feet from the code symbol reading system 100) the intensity of the collected light (e.g., the laser beam reflected off the code symbol 16) will be adequate to allow the system 100 to decode (e.g., read) the code symbol 16. When the code symbol 16 is at the far range (e.g., greater than about seventeen feet from the system 100) of the working area, the intensity of the collected light can be significantly reduced from intensity levels in the near range (e.g., 1600 times less than intensity levels in the near range). The resulting analog scan data signal corresponding to the light intensity is often too weak to be decoded by the system 100. The practical result is that the user of the system 100 attempting to scan code symbols 16 in or near the far range often encounters significant read delays or misreads.

Figure 3:
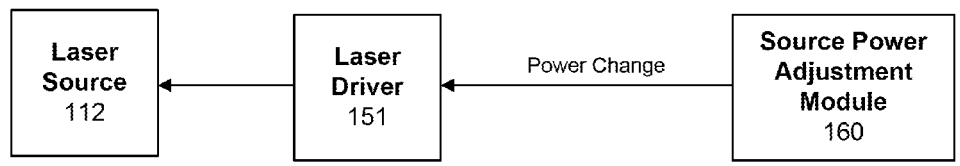
FIG. 3 is block diagram depicting the interaction between selected components of an exemplary code symbol reading system according to the present invention.
Figure 4:
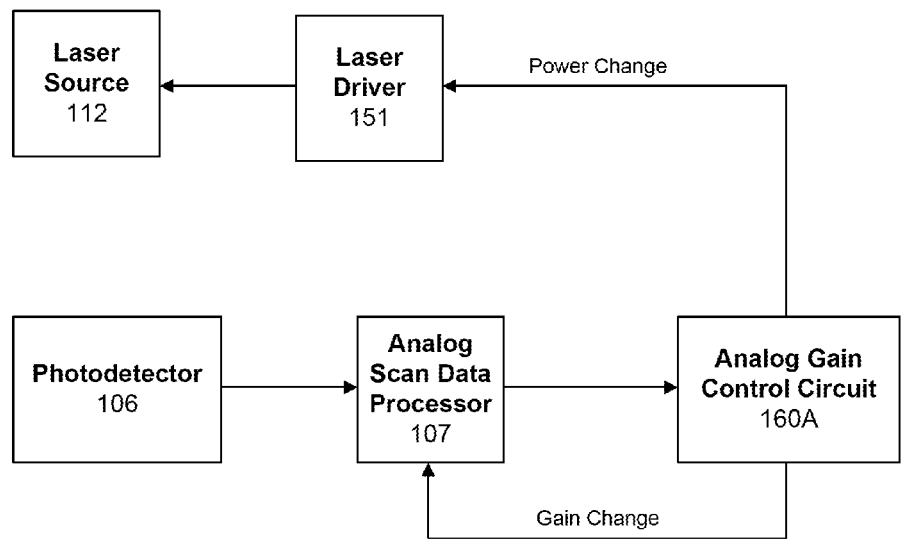
FIG. 4 is block diagram depicting the interaction between selected components of an exemplary code symbol reading system according to the present invention.
Figure 5:
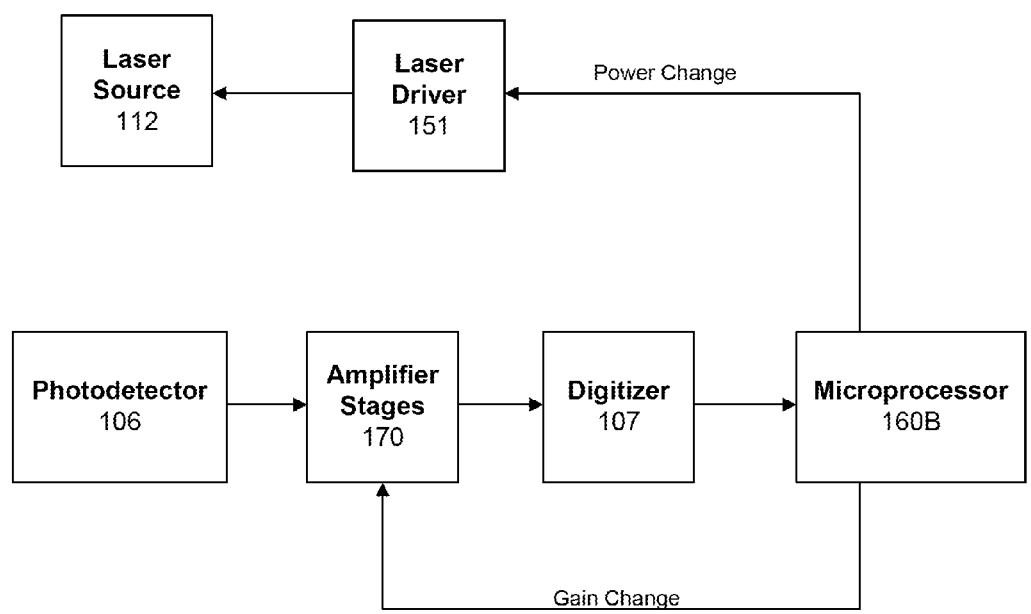
FIG. 5 is block diagram depicting the interaction between selected components of another exemplary code symbol reading system according to the present invention.

As shown in FIGS. 3 through 5, to combat this problem, the source power control module 160 monitors the analog scan digital signal corresponding to the detected light intensity. When the intensity of the reflected laser beam drops below a predefined intensity level, the source power control module 160 causes the laser source 112 to increase the power of its emitted laser beam. As a result of the increased power, the intensity of the reflected light is also increased. The source power control module 160 continues to cause the laser source 112 to increase the intensity of its emitted laser beam until the source power control module 160 detects that the reflected laser beam's intensity is above the level of the predefined threshold.

The source power control module 160 may similarly be adapted to decrease the intensity of the laser beam emitted by the laser source 112. This may be advantageous in that it allows for reduced power use by the laser source 112, thereby decreasing heat output and degradation of the laser source 112.

The source power control module 160 may comprise an automatic gain control circuit 160A or a microprocessor 160B configured to regulate the reflected laser beam's intensity within a predefined intensity range.

As shown in FIGS. 4 and 5, the source power control module 160 may combine the novel technique of adjusting the power of the laser source 112 with the technique of adjusting the gain of the first signal (i.e., adjusting the first signal after processing by the photodetector 106). Typically, the first signal's gain is adjusted via an analog gain control circuit 160A, though it may be adjusted through a microprocessor 160B. Gain adjustments may be made at various stages of the processing of the first signal, including during processing by the analog scan data processor 107 or during amplifier stages 170. This novel approach of adjusting the signal on both the emitting side and the receiving side of the code symbol reading system 100 allows the two techniques to complement each other, potentially resulting in greatly improved performance. By combining power control techniques with gain control techniques, the maximum dynamic range of the system 100 can be greatly improved. For example, if the dynamic range using gain control is M:1, and the dynamic range using power control is N:1, then the maximal dynamic range resulting from employment of both techniques could be (M*N):1.

The foregoing exemplary embodiments typically refer to a 1-D barcode but may be used to scan and read other symbols, such as 2-D barcodes, 2-D stacked linear barcodes, and 2D matrix codes. As used herein, the term "code symbol" includes such symbols and any symbol used to store information.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); and U.S. patent application Ser. No. 13/912,262 for a Method of Error Correction for 3D Imaging Device, filed Jun. 7, 2013 (Jovanovski et al.).

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A system for reading code symbols in a laser scanning field, comprising:
a laser scanning module for scanning a laser beam across a laser scanning field, the laser scanning module comprising a laser source;
a photodetector for detecting the intensity of light reflected from the laser scanning field and generating a first signal corresponding to the detected light intensity; and
a source power control module for:
controlling the power supplied to the laser source in response to the first signal; and
controlling a gain of the first signal;
wherein the system's dynamic range controlling only the power supplied to the laser source is N:1;
wherein the system's dynamic range controlling only the gain of the first signal is M:1; and
wherein the system's dynamic range controlling both the power supplied to the laser source and the gain of the first signal is (M*N):1.

2. The system of claim 1, wherein the source power control module controls the power to maintain the intensity of the light reflected from the laser scanning field within a predetermined intensity range.

3. The system of claim 1, wherein the source power control module comprises an automatic gain control circuit.

4. The system of claim 1, wherein the source power control module comprises a microprocessor.

5. The system of claim 1, wherein the source power control module controls the gain of the first signal to maintain the first signal's amplitude within a predetermined amplitude range.

6. A method for reading code symbols, comprising:
supplying power to a laser source to generate a laser beam having a dynamic range of N:1;
scanning the laser beam across a laser scanning field;
detecting the intensity of light reflected from the laser scanning field;
generating a first signal corresponding to the detected intensity of light reflected from the laser scanning field;
amplifying the first signal according to a gain to achieve a dynamic range of M:1;
controlling, in response to the first signal, the power supplied to the laser source and the gain amplifying the first signal to achieve a dynamic range of (M*N):1.

7. The method of claim 6, comprising controlling the power supplied to the laser source to maintain the intensity of the light reflected from the laser scanning field within a predetermined intensity range.

8. The method of claim 6, comprising controlling the power supplied to the laser source via an automatic gain control circuit.

9. The method of claim 6, comprising controlling the power supplied to the laser source via a microprocessor.

10. The method of claim 6, comprising controlling the gain of the first signal.

11. The method of claim 6, comprising controlling the gain of the first signal to maintain the first signal's amplitude within a predetermined amplitude range.

12. The method of claim 6, comprising:
controlling the power supplied to the laser source via a source power control module; and
controlling the gain of the first signal via the source power control module.

13. The method of claim 6, comprising:
controlling the power supplied to the laser source via a source power control module to maintain the intensity of the light reflected from the laser scanning field within a predetermined intensity range; and
controlling the gain of the first signal via the source power control module to maintain the first signal's amplitude within a predetermined amplitude range.

14. A method for reading code symbols, comprising:
supplying power to a laser source to generate a laser beam having a dynamic range of N:1;
scanning the laser beam across a laser scanning field;
detecting the intensity of light reflected from the laser scanning field;
generating a first signal corresponding to the detected intensity of light reflected from the laser scanning field;
amplifying the first signal according to a and gain to achieve a dynamic range of M:1; and
controlling, in response to the amplified first signal, the power supplied to the laser source and the gain amplifying the first signal to achieve a dynamic range of (M*N):1.

15. The method of claim 14, comprising controlling the power supplied to the laser source to maintain the intensity of the light reflected from the laser scanning field within a predetermined intensity range.

16. The method of claim 14, comprising controlling the power supplied to the laser source via an automatic gain control circuit.

17. The method of claim 14, comprising controlling the power supplied to the laser source via a microprocessor.

18. The method of claim 14, comprising:
controlling the power supplied to the laser source via a source power control module; and
controlling the gain at which the first signal is amplified via the source power control module.

19. The method of claim 14, comprising:
controlling the power supplied to the laser source via a source power control module to maintain the intensity of the light reflected from the laser scanning field within a predetermined intensity range; and
controlling the gain at which the first signal is amplified via the source power control module to maintain the first signal's amplitude within a predetermined amplitude range.

* * * * *